United States Patent [19]

Harlow, Jr. et al.

[11] 4,240,517
[45] Dec. 23, 1980

[54] POWERTRAIN AND INDEPENDENT SUSPENSION MOUNTING ARRANGEMENT FOR FRONT-WHEEL-DRIVE VEHICLE

[75] Inventors: John H. Harlow, Jr., Farmington Hills; Joseph Maywood, Troy, both of Mich.

[73] Assignee: General Motors Corporation, Detroit, Mich.

[21] Appl. No.: 29,625

[22] Filed: Apr. 13, 1979

[51] Int. Cl.³ .............................................. B60K 5/04
[52] U.S. Cl. .................................. 180/295; 180/297; 180/299; 180/300; 248/605
[58] Field of Search ............... 180/54 F, 55, 295, 292, 180/300, 299, 297, 252, 12, 291; 248/603, 605, 614

[56] References Cited

U.S. PATENT DOCUMENTS

| 2,076,046 | 4/1937 | Schjolin | 180/54 F |
|---|---|---|---|
| 3,326,501 | 6/1967 | Cauvin | 180/297 X |
| 3,851,722 | 12/1974 | Grosseau | 248/614 X |

FOREIGN PATENT DOCUMENTS 852706  10/1960  United Kingdom ...................... 180/55

*Primary Examiner*—John A. Pekar
*Attorney, Agent, or Firm*—R. L. Phillips

[57] ABSTRACT

In a front-wheel-drive vehicle having a powertrain with a transversely positioned engine and transmission and independent front-wheel suspensions each with a control arm, there is provided a cradle to which the drive-wheel suspension control arms are swingably mounted. A plurality of cushion mounts support the cradle at high impedance points on the vehicle body and provide a soft substantially linear spring rate at small vibratory amplitudes of the cradle in both a fore and aft direction and a vertical direction relative to the vehicle and a stiff substantially linear spring rate at all vibratory amplitudes of the cradle in a lateral direction relative to the vehicle. The powertrain is directly supported on the cradle by a plurality of cushion mounts which have soft substantially linear spring rates in the same directions as the cradle mounts. In addition, both the fore and aft rate and vertical rate of the cradle mounts and also the pitch rate of the powertrain mounts are controlled so as to be non-linear at large amplitudes of the cradle and powertrain in the respective directions. Furthermore, a rigid strut is cushion mounted between the powertrain and a mounting point on the vehicle so as to be in either tension or compression depending on whether the transmission is in forward or reverse drive. The strut mounts provide a soft substantially linear rate at small-amplitude powertrain pitch motions occurring at low powertrain torque and provide a non-linear rate at large-amplitude pitching motions occurring at high torque and cooperate with both the cradle mounts and the powertrain mounts to control and isolate pitching motions of the powertrain.

3 Claims, 16 Drawing Figures

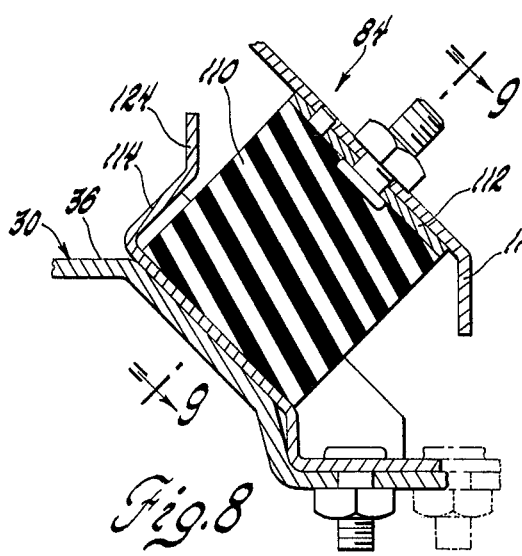
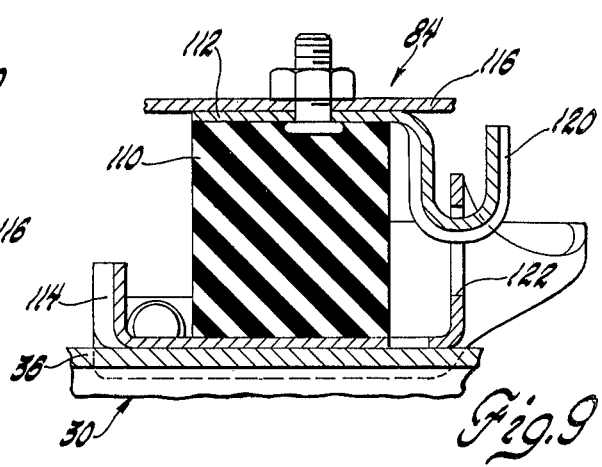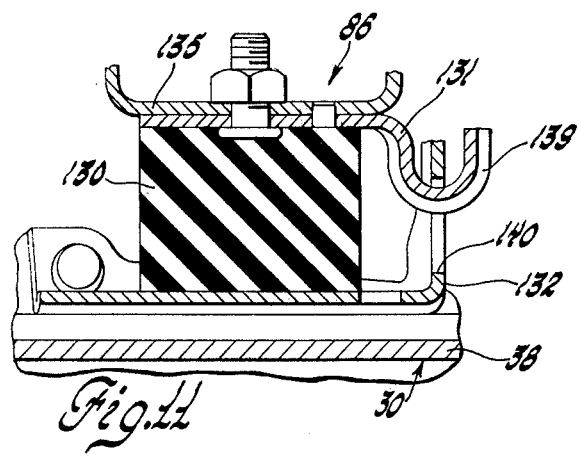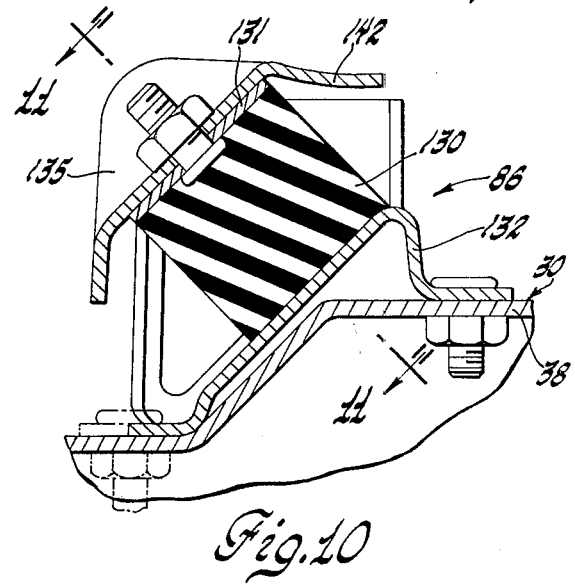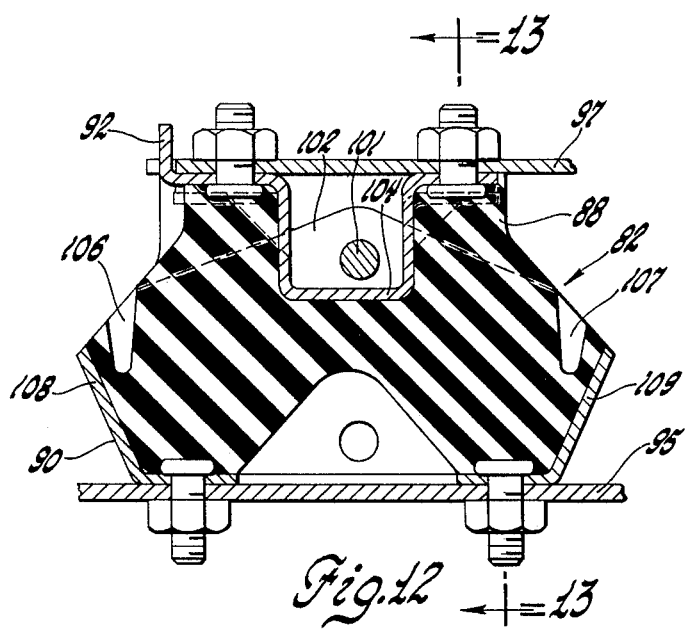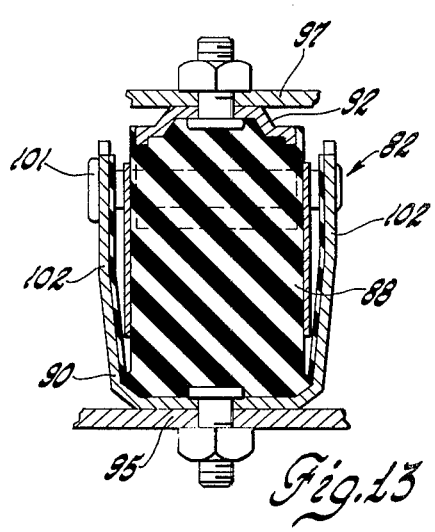

$K^B$ (SPRING RATE) = CRADLE TO BODY
$K^E$ (SPRING RATE) = CRADLE TO ENGINE
$K^T$ (SPRING RATE) = CRADLE TO TRANSMISSION
$K^{B\cdot E}$ (SPRING RATE) = BODY TO ENGINE l = LATERAL   v VERTICAL
         YAW
PITCH
         ROLL
f = FORE & AFT

POWERTRAIN AND INDEPENDENT SUSPENSION MOUNTING ARRANGEMENT FOR FRONT-WHEEL-DRIVE VEHICLE

This invention relates to mounting arrangements for mounting an engine-transmission-differential assembly and independent front-wheel suspensions in a front-wheel drive vehicle and more particularly to such mounting arrangements wherein the engine and transmission are mounted transversely in the vehicle.

In front-wheel-drive vehicles, it is common practice to have the engine and transmission mounts cushion the torque reaction of the differential as well as that of the engine and transmission. In the case where the engine and transmission are mounted longitudinally in the vehicle, the torque reaction of the differential is in the pitch direction relative to the vehicle while the torque reaction of both the engine and transmission is in the roll direction. As a result, the torque reaction of the differential is not difficult to deal with at the cushion mounts for the engine and transmission since the pitch forces on the powertrain may be simply resisted by their vertical spring rates while adequate roll resistance is retained for the engine and transmission. However, in the case where the engine and transmission are mounted transversely in the vehicle, their torque reaction is then in the pitch direction and the torque reaction of the differential which is also in the pitch direction is then directly coupled therewith. This imposes a much greater duty on the cushion mounts supporting the engine and transmission since the pitching forces in addition to the normal engine and transmission torque reaction are then influenced by the product of the axle ratio at the differential and the acting transmission ratio. According to conventional practice and irrespective of the relative position of the engine and transmission in the vehicle, it is desired that the cushion mounts therefor be located adjacent the points of minimum vibratory force in the system, i.e. the node points, to derive maximum benefit in isolating the vibration of the sprung mass including the differential. However, where the vehicle is of compact size and where the engine is of the type with relatively high degrees of vibration, e.g. an in-line four-cylinder and a V-6 versus a V-8 engine, there is typically little space for a conventional cushion mounting arrangement capable of effectively controlling and isolating pronounced powertrain vibrations and particularly the vertical motion or shake and pitching motion thereof where both the engine and transmission are positioned transversely in the vehicle.

Moreover, such front-wheel-drive vehicles typically have independent front suspensions separate supporting the front-drive wheels. These suspensions include control arms which also vibrate but as a result of contact of the drive wheels with an irregular road surface. To control and isolate these vibrations, there is normally provided a cushion mounting arrangement therefor whose characteristics are typically substantially different in certain respects from those desired of the cushion mounting arrangement for the powertrain. Prior cushion mounting arrangements, including those with a cushion mounted subframe having the suspension arms mounted thereon and the powertrain at least partially cushion mounted thereon have exhibited limited ability, so far as known, in effectively controlling and isolating the vibrations of the independent front suspension control arms and the powertrain from each other and from the vehicle body and/or chassis wherein both the engine and transmission are positioned transversely in the vehicle and the engine has pronounced vibration.

The present invention is directed to providing improved vibration control and isolation in a front-wheel-drive vehicle of compact size having both a powertrain with a transversely positioned engine and transmission and independent front-wheel suspensions each with a control arm. In the preferred embodiment, there is provided a rigid cradle or subframe to which the drive-wheel suspension control arms are swingably connected. A plurality of cushion mounts support the cradle at high impedance points on a unitized vehicle body remote from the powertrain with each of these cushion mounts providing a soft substantially linear spring rate at small vibratory amplitudes of the cradle in both a fore and aft direction and a vertical direction relative to the vehicle and a stiff substantially linear spring rate at all vibratory amplitudes of the cradle in a lateral direction relative to the vehicle. Moreover, the cradle mounts are provided with rate control so that they become non-linear at large vibratory amplitudes in the fore and aft direction and also the vertical direction wherein their rate in these directions then increases with increasing large vibratory amplitude. The cradle mounts with their soft linear rates in the fore and aft direction and vertical direction are particularly effective in isolating small-amplitude high-frequency vibrations of the front-suspension control arms caused by front wheel impacts with an irregular road surface while their stiff linear rate in the lateral direction is effective in providing good lateral stability while controlling and isolating lateral vibrations of the front-suspension control arms at all amplitudes and throughout the frequency range for good road handling. On the other hand, the non-linear rates of the cradle mounts in the fore and aft direction and the vertical direction are particularly effective in controlling and isolating large-amplitude vibrations of the front-suspension control arms caused by severe front-drive wheel impacts with an irregular road surface as well as high forces due to braking and acceleration. Moreover, this combination of linear and non-linear rates in the cradle mounts is used to help control and isolate vibrations of the powertrain.

In the present invention, none of the weight of the powertrain is directly supported on the vehicle body and instead, a plurality of cushion mounts directly support the powertrain at mounting points on the cradle and with soft substantially linear spring rates in the same directions as the cradle mounts. Moreover, the powertrain mounts are provided with pitch rate control so that they become non-linear at large vibratory amplitudes in the pitching direction of the powertrain and with a rate which increases with increasing large vibratory pitching amplitude. With such series arrangement of the powertrain mounts and the cradle mounts, they provide very soft effective spring rates between the vehicle body and the vehicle body for controlling and isolating small-amplitude high-frequency vibrations of the powertrain in the fore and aft, vertical, lateral, roll and yaw directions as well as providing some control and isolation of the pitching motions of the powertrain at low torque. Then at high-amplitude vibrations, the non-linear rates of both the cradle mounts and the powertrain mounts are particularly effective in controlling and isolating low-frequency vibrations of the powertrain as well as providing some control and isolation of the powertrain pitching motions at high torque.

To provide for effective control and isolation of powertrain pitching motion throughout the torque range, there is added a rigid torque reaction strut which is connected with cushion mounts between the powertrain and a cross-member on the vehicle body so as to be in either tension or compression depending on whether the transmission is in forward or reverse drive. The strut mounts provide a soft substantially linear spring rate at small vibratory pitching amplitudes occurring with low torque and together with the soft linear rates of the powertrain mounts and both the soft fore and aft linear rate and soft vertical rate of the cradle mounts effectively control and isolate small-amplitude pitching vibrations of the powertrain at such low torque. Then for large pitching powertrain amplitudes occurring at high torque, the strut mounts are additionally provided with non-linear rates that then become effective and increase with increasing large pitching amplitudes and together with the non-linear rates of both the cradle mounts and the powertrain mounts effectively control and isolate large-amplitude pitching vibrations of the powertrain at such high torque.

These and other objects, advantages and features of the present invention will become more apparent from the following description and drawings in which:

FIG. 8 is an enlarged view of the front transmission mount taken along the line 8—8 in FIG. 2.

FIG. 9 is a view of the front transmission mount taken along the line 9—9 in FIG. 8.

FIG. 10 is an enlarged view of the rear transmission mount taken along the line 10—10 in FIG. 2.

FIG. 11 is a view of the rear transmission mount taken along line 11—11 in FIG. 10.

FIG. 12 is an enlarged view of the engine mount taken along the line 12—12 in FIG. 2.

FIG. 13 is a view of the engine mount taken along the line 13—13 in FIG. 12.

Figure 1:
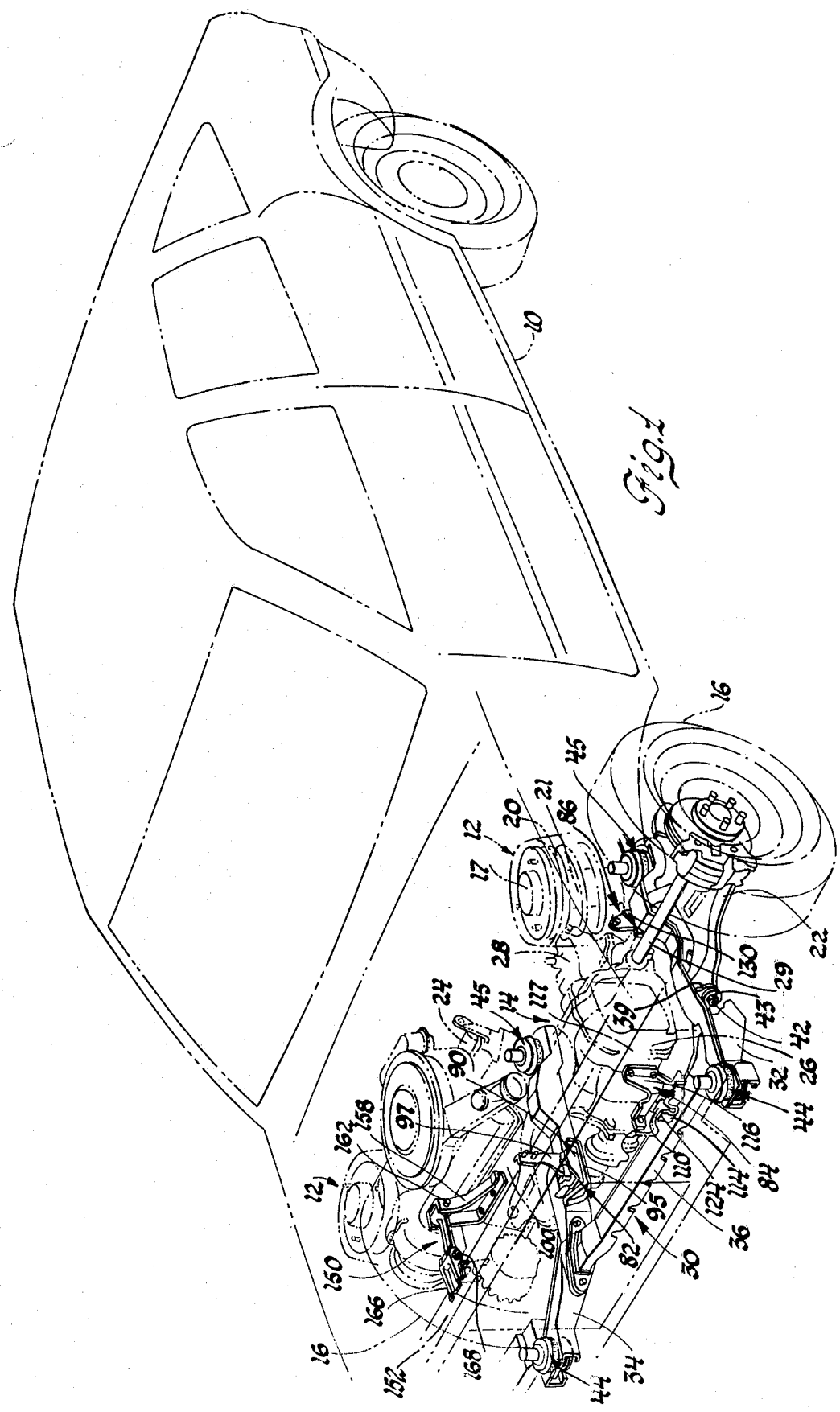
FIG. 1 is a perspective view of a front-wheel-drive vehicle of compact size embodying the present invention.

Referring to the drawings and particularly to FIGS. 1-4, there is shown a front-wheel-drive vehicle of compact size having a unitized body and frame 10 which will hereinafter be referred to as the vehicle body and on which independent front-wheel suspensions 12 and a powertrain 14 are cushion mounted according to the presently preferred embodiment of the invention. To provide clear viewing of the details of the invention, certain vehicle components or parts not necessary to understanding the invention are shown only partially or have been omitted entirely.

Figure 2:
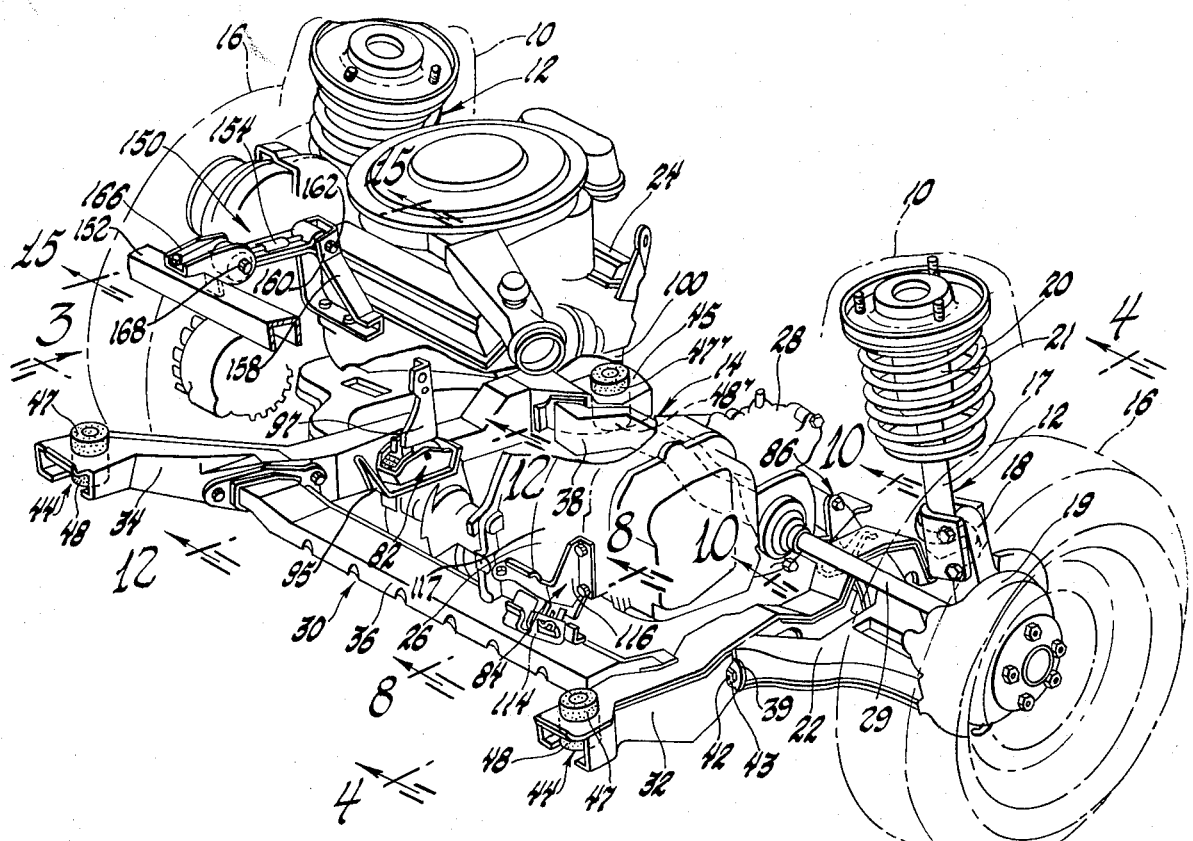
FIG. 2 is an enlarged view similar to FIG. 1 but with the vehicle body removed.

Turning first to the independent front-wheel suspensions 12, each of the front wheels 16 is suspended with a MacPherson type strut arrangement 17 which is mounted between a high impedance point on the vehicle body 10 and the steering knuckle 18 of a wheel mount and brake assembly 19. The front suspensions further include a telescoping coil spring 20 and hydraulic shock absorber 21 integrated with the suspension strut and a wishbone-shaped lower control arm 22 which is pivotally connected at its outboard end to the respective steering knuckle 18 and is swingably mounted at its inboard end indirectly on the vehicle body 10 as described in detail later. All this front suspension structure is shown in FIGS. 1 and 2 for the left front wheel and it will be understood that the suspension for the right front wheel has corresponding components. Furthermore, it will be understood that a stabilizer bar (not shown) is connected to the cradle 30 and lower control arms 22 and that a steering system (not shown) is connected to the steering knuckles 18 to respectively effect stabilization and steering of the front wheels. Each of the front wheels 16 is thus supported sprung, damped and steered in a well-known manner and therefore further detailed description, apart from the mounting of the lower control arms 22 is unnecessary.

Figure 4:
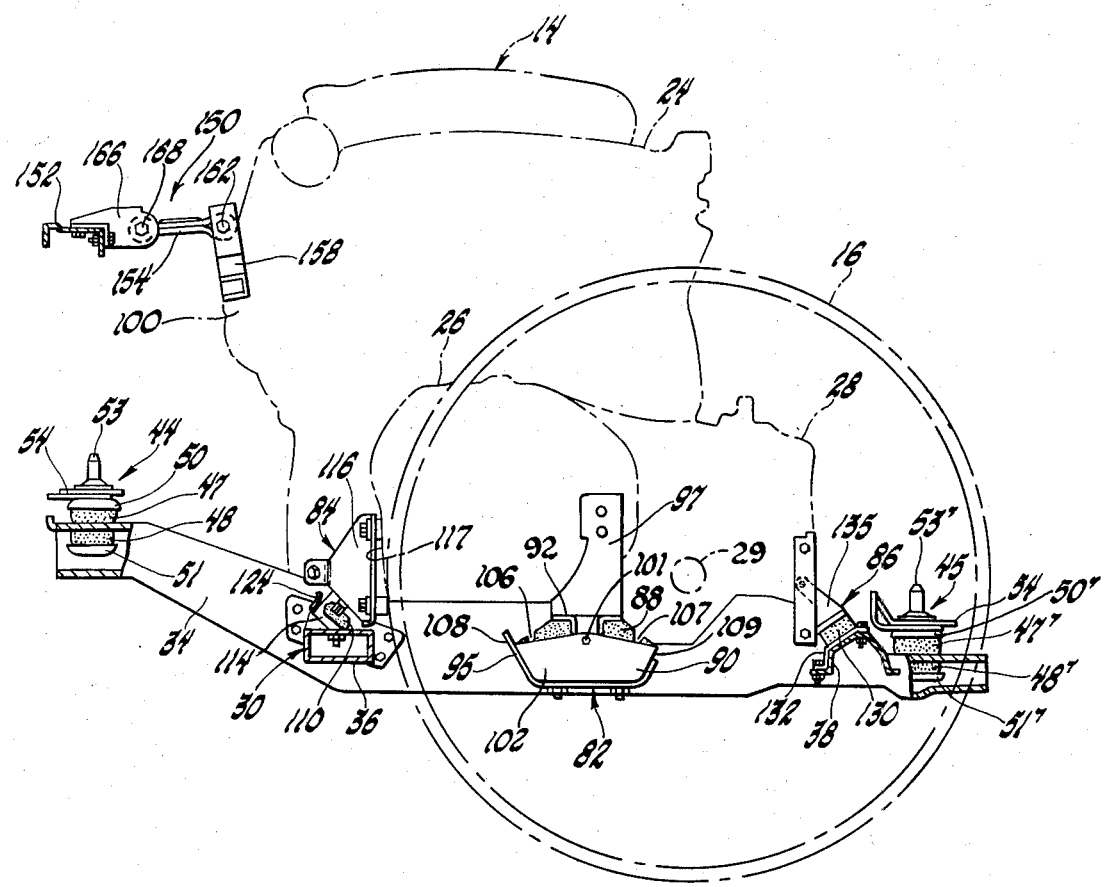
FIG. 4 is an enlarged side view taken along the line 4—4 in FIG. 2.

The powertrain 14 comprises a V-6 engine 24, manual transmission 26 and differential 28 which are rigidly joined together in a conventional manner with the combination of the transmission and differential commonly referred to as a transaxle. As shown in FIG. 4, the engine 24 is located ahead of the differential 28 and positioned transversely or crosswise of the vehicle body 10. The transmission 26 is also positioned transversely of the vehicle body and is joined to the rear end of the engine at the left side of the vehicle and selectively drivingly connects the engine to the differential with different forward drive gear ratios and a reverse drive gear ratio. The differential 28 with its reduction and differential gearing is located directly between the front wheels 16 and is connected to drive these wheels through half-shafts 29. The powertrain is of a conventional type and therefore further description thereof, apart from its cushion mounting and vibratory motion under certain conditions, is unnecessary.

Figure 7:
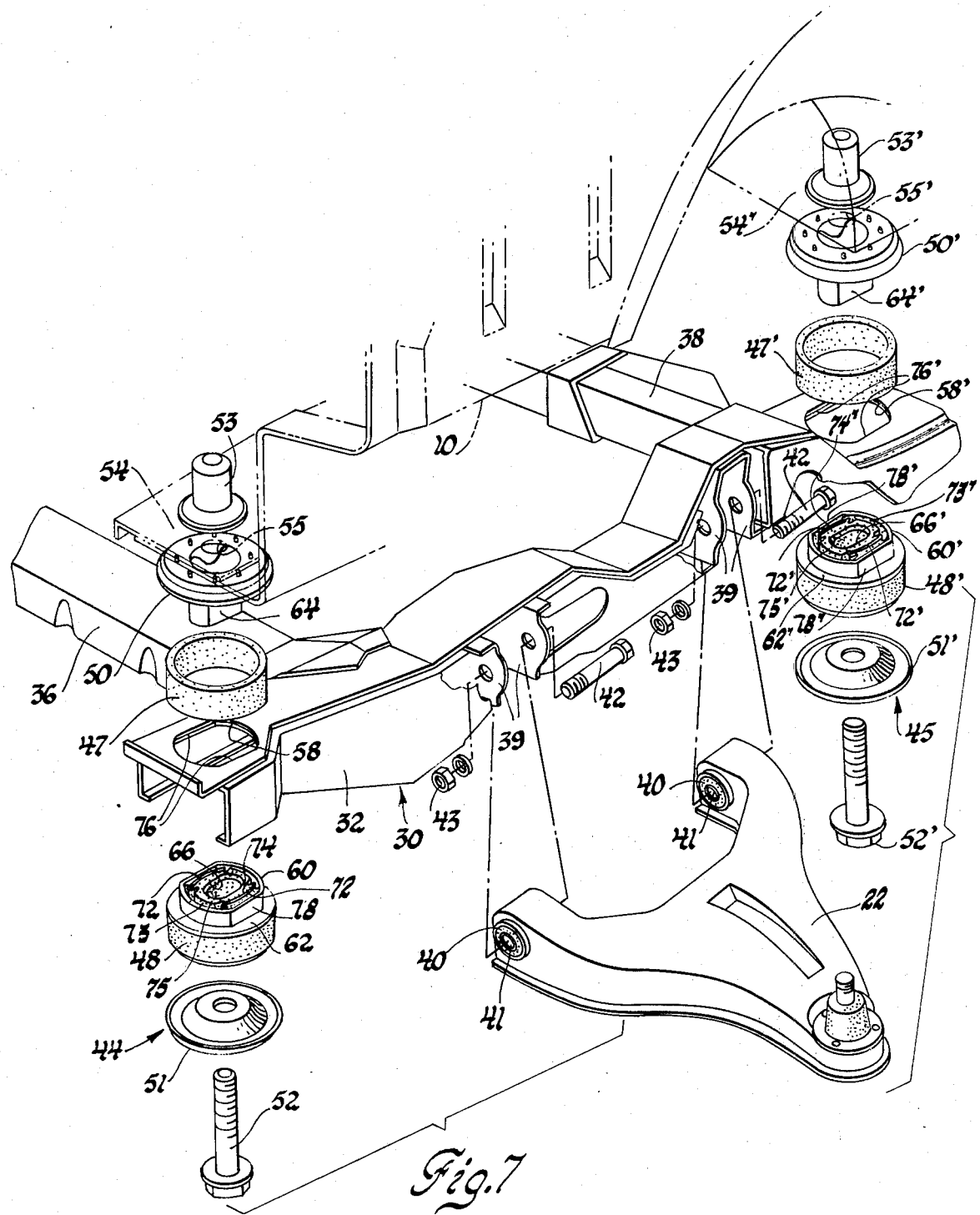
FIG. 7 is an enlarged exploded view of the left end of the cradle, left control arm and mounting assemblies therefor shown in FIG. 1.
Figure 14:
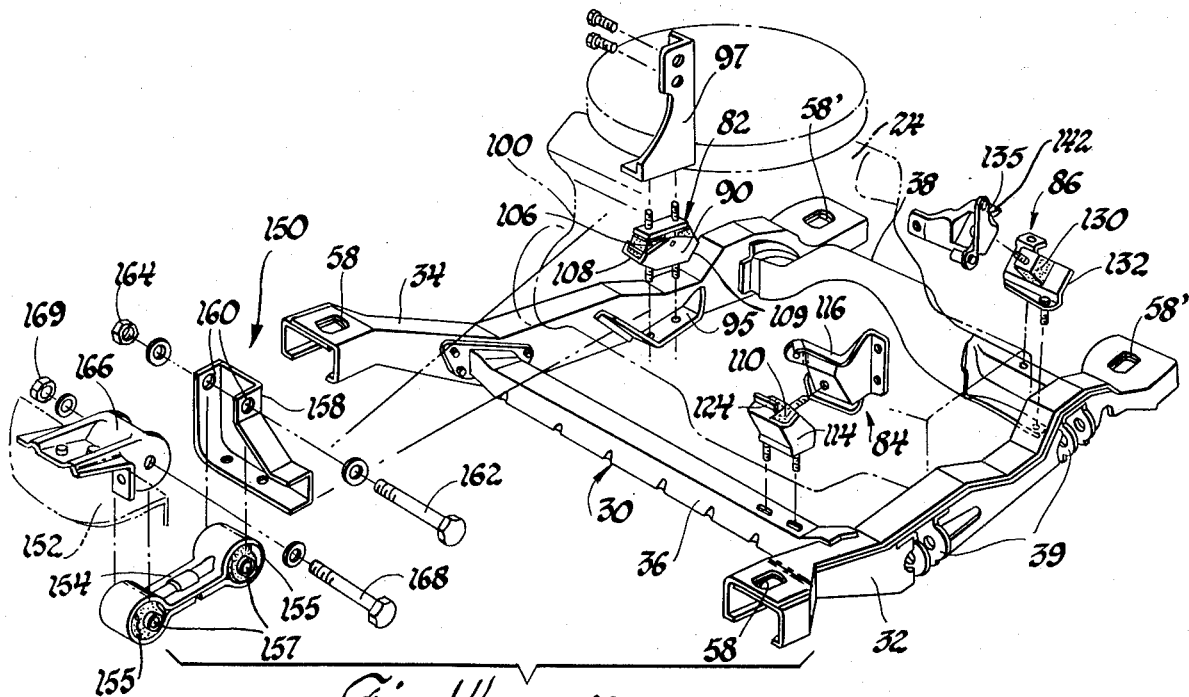
FIG. 14 is an enlarged exploded view of the transmission mounts, engine mount and torque reaction strut assembly in FIG. 1.

The powertrain 14 and the lower control arm 22 of both the independent front-wheel suspensions 12 are supported on the vehicle body 10 through a rigid cradle or subframe 30 separate from the vehicle body and mounted on the underside thereof. The cradle 30 comprises two side-rails 32, 34 and two cross-rails 36, 38 which respectively extend laterally and transversely of the vehicle body with the cross-rails joined at their ends to the side-rails at points inward of the ends of the latter as seen in FIGS. 1-4, 7 and 14. The control arms 22 are swingably mounted at their inboard end to the respective side-rails 32 and 34 of the cradle by a pair of brackets 39 which are welded in the outboard side of the respective side-rails and each receive the end of one of the two legs of the control arms on this side. As seen in FIG. 7, an elastomeric bushing 40 is mounted in each end of the control arm legs and has a sleeve 41 extending centrally therethrough. The sleeve 41 is bonded to the bushing 40 and a bolt 42 extends through each bracket 39 and the associated bushing sleeve 41 and is secured with a nut 43. All the above front-suspension control arm mounting structure is shown for the left control arm and it will be understood that the right control arm is similarly mounted.

The cradle 30 is mounted at four high impedance points on the vehicle body 10 on opposite sides of the front wheel wells and remote from the powertrain 14. The cradle cushion mounting arrangement comprises two front cushion mounts 44 and two rear cushion mounts 45. Each of the front cradle cushion mounts 44 is located adjacent the front end of one of the cradle side-rails 32 and 34 ahead of the transversely positioned engine 24 and transmission 26. Each of the rear cushion mounts 45 is located adjacent the rear end of one of the cradle side-rails 32 and 34 rearward of the differential 28. With the relative arrangement of the powertrain 14 and the cradle 30 shown, a greater portion of the weight of the powertrain is supported by the two rear cradle mounts 45 as well as the roll stabilizer bar loads. In the cradle cushion mounting arrangement shown, the two front mounts 44 are identical to each other and the rear cradle mounts 45 are also identical to each other and similar in construction and assembly to the front cradle mounts 44. In the description of the left front cradle mount 44 that follows, it will thus be understood that such description applies to the right front mount and that the corresponding parts of the rear cradle mounts 45, as shown in FIG. 7, will be identified by the same numerals but primed. Furthermore, it will be understood that the appropriate parts of the rear cradle mounts are made proportionately larger in load bearing capacity is than the front cradle mounts to handle the higher loading thereon as will be seen by the higher spring rates they are provided with as described later.

Figure 6:
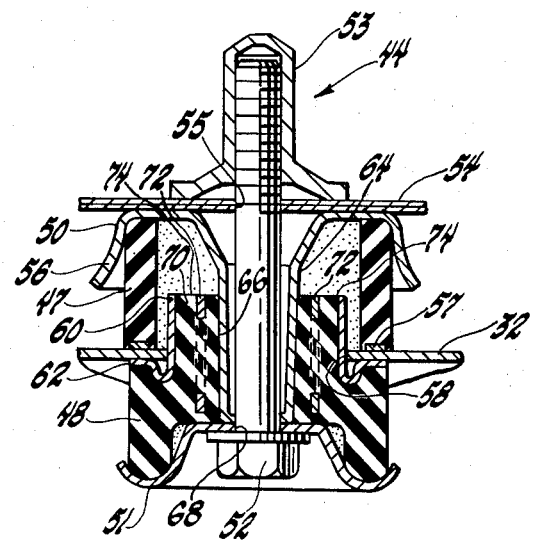
FIG. 6 is a view of the left front cradle mounts taken along the line 6—6 in FIG. 5.
Figure 5:
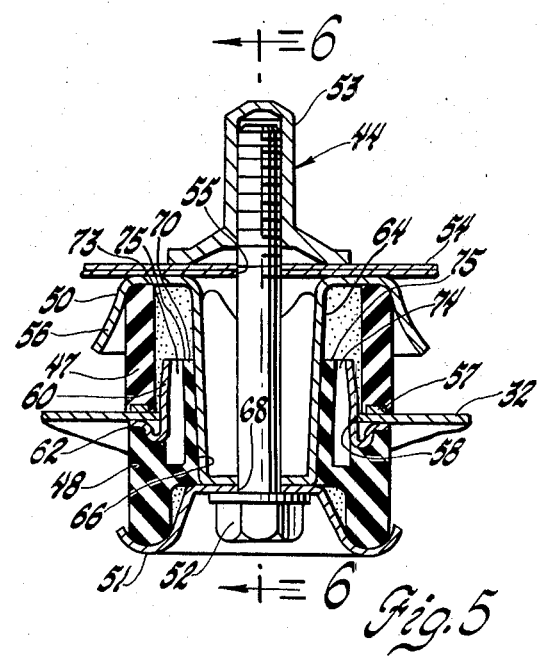
FIG. 5 is an enlarged view of the left front cradle mount taken along the line 5—5 in FIG. 3.

Describing now the left front cradle mount 44 which is best seen in FIGS. 5, 6 and 7, there is provided a pair of ring-shaped elastomeric cushions 47 and 48, a spacer 50, a retainer 51, a bolt 52 and a cage nut 53. The spacer 50 engages at its upper end with the lower side of a rigid front underbody portion 54 of the vehicle body 10 about a cradle mounting bolt hole 55 therethrough over which the cage nut 53 is located. The spacer 50 has an annular downwardly extending and radially outwardly flared rate control collar 56 formed integral therewith and the upper cushion 47 engages at its upper end with the lower side of the spacer 50 inward of its rate control collar. The rate control collar 56 provides for non-linear rate control in the cradle mount in the vertical direction as will be described in detail later. The upper cushion 47 has a washer 57 bonded to its lower end which engages the upper side of the cradle side-rail 32 about a mounting hole 58 therethrough which aligns with the overhead bolt hole 55 in the rigid underbody portion 54. A sleeve 60 having a radially outwardly extending shoulder 62 at its lower end is bonded to the lower cushion 48. The sleeve 60 extends vertically upward through the mounting hole 58 in the cradle side-rail while the shoulder 62 on the sleeve engages the lower side of the cradle side-rail about the hole. The spacer 50 also has a centrally located elongated hollow neck 64 of generally rectangular cross-section which extends vertically downward through a correspondingly-shaped central opening 66 in the lower cushion 48 and engages at its lower end with the upper side of the retainer 51 about a central bolt hole 68 therethrough.

The retainer 51 engages the lower end of the lower cushion 48 and the spacer 50 and retainer 51 are clamped together through the spacer neck 64 and against the lower side of the rigid underbody portion 54 by the bolt 52 which extends vertically upward through the retainer bolt hole 68, spacer neck 64 and underbody portion bolt hole 55 and is threaded to the cage nut 53. The lower cushion 48 has an integral upwardly extending annular neck 70 which is bonded at its periphery to the interior of sleeve 60 along its length except as described later and has a central opening therethrough co-extensive with cushion opening 66 through which the spacer neck 64 extends with an interference fit. Thus, the elastomeric annular neck 70 is tightly captured between sleeve 60 and spacer neck 64. In addition, a pair of perforated rate plates 72 are molded in place in the elastomeric neck 70 of the lower cushion 48 on opposite sides thereof with these plates extending longitudinally or fore and aft of the cradle side-rail and thus the vehicle body. Furthermore, a pair of voids 73 are formed at diametrically opposite locations between the interior of the sleeve 60 and the periphery of the elastomeric neck 62 in the two areas intermediate the rate plates 72. The voids 73 extend vertically the length of the sleeve 60 and are bisected by a plane extending longitudinally or fore and aft of the cradle side-rail and thus the vehicle body. The voids 73 leave the elastomeric neck 70 with diametrically opposite relatively thick radial sections 74 each containing one of the rate plates 72 and joining the spacer neck 64 and the sleeve 60 at opposite sides thereof in the lateral direction relative to the cradle side-rail as seen in FIG. 6. In addition, the voids 73 leave the elastomeric neck 70 with diametrically opposite thin radial sections 75 trapped between the spacer neck 64 and the sleeve 60 in the fore and aft direction relative to the cradle side-rail as seen in FIG. 5. The thin radial sections 75 of the elastomeric neck 70 are spaced radially inward of the interior of the sleeve 60 and provide non-linear rate control in the cradle mount in the fore and aft direction as described in more detail later. To fix the above described orientation of the cradle mount assembly relative to the cradle and thus also to the powertrain mounted thereon, the mounting hole 58 in the cradle side-rail is provided with parallel flats 76 which extend longitudinally or fore and aft of the cradle side-rail and engage corresponding parallel flats 78 formed on the periphery of the sleeve 60 which is bonded to the lower cushion 48.

Figure 16:
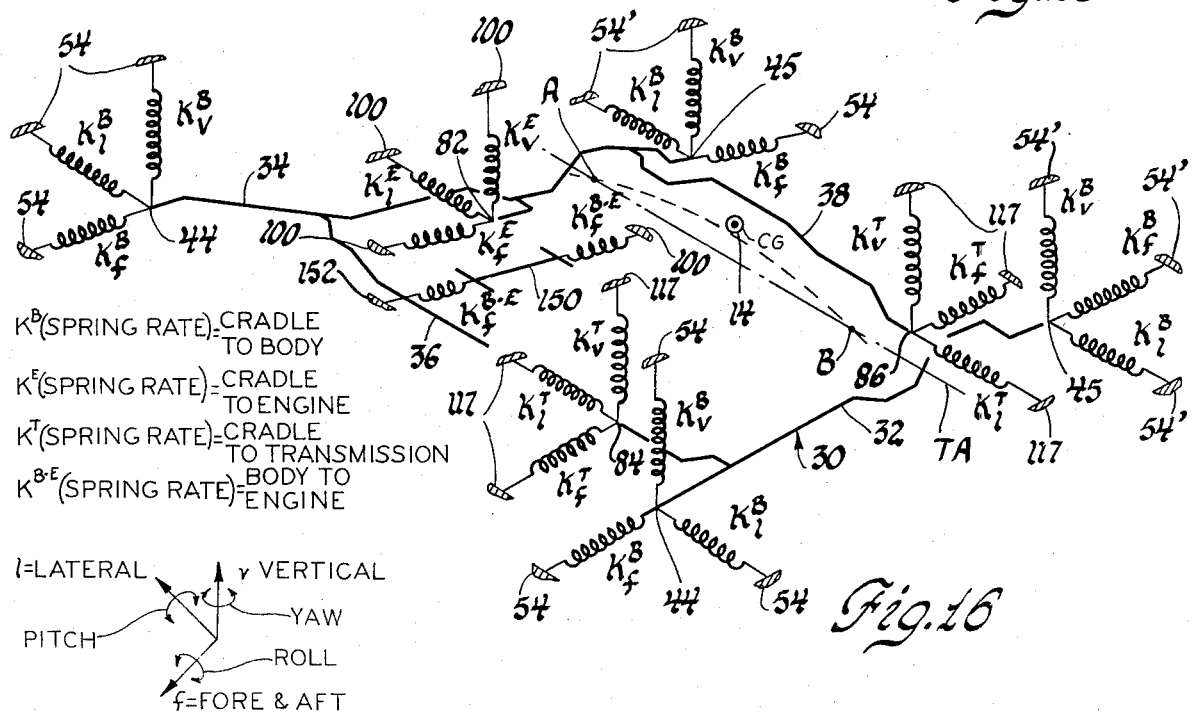
FIG. 16 is a vibration schematic of the combined cradle mounting arrangement and powertrain mounting arrangement in FIG. 1.

With the cradle mounting arrangement thus provided and as shown schematically in FIG. 16, the cradle mounts 44 and 45 operate to provide a low or soft substantially linear spring rate cushioning cradle motion at small vibratory amplitudes in the vertical direction (shake) relative to the vehicle body (e.g. less than 5 mm). This is accomplished by their upper cushions 47, 47' providing through their height soft linear spring rates in compression at relatively low and high values to resist upward vertical movement of the cradle 30 relative to the vehicle body at these mounting points until further compression thereof is resisted by the rate control collars 56, 56' while the lower cushions 48, 48' through their height provide correspondingly soft substantially linear spring rates in compression at relatively low and high values but to resist relative downward movement of the cradle. At large vibratory amplitudes in the vertical direction (e.g. greater than 5 mm), the deformation of the upper cushions 47, 47' is then resisted by gradual engagement with the rate control collar 56, 56' resulting in these cushions then providing non-linear rates in the vertical direction which then increase with increasing large vibratory amplitude of the cradle in this direction at these mounting points to thereby provide increasing stiffness to control and isolate such vibrations.

The cradle mounts 44 and 45 also operate to provide a low or soft substantially linear spring rate cushioning cradle motion at small vibratory amplitudes in the fore and aft direction (e.g. less than 5 mm). This is accomplished by the transverse shear resistance along the thick radial sections 74, 74' of the elastomeric necks 70, 70' parallel to the rate plates 72, 72' which effectively provides soft substantially linear spring rates at relatively low and high values resisting such motion at small vibratory amplitudes at these mounting points until the thin radial sections 75, 75' of the elastomeric necks bottom out in the voids 73, 73' at large vibratory amplitudes in the fore and aft direction (e.g. greater than 5 mm). With such bottoming out, there is resultantly provided non-linear spring rates in the fore and aft direction in the front and rear cradle mounts of relatively low and high value which increase with increasing large vibratory amplitude of the cradle in the fore and aft direction at these mounting points to control and isolate such vibrations.

On the other hand, the cradle mounts 44 and 45 operate to provide a high or stiff substantially linear spring rate cushioning cradle motion at all vibratory amplitudes in the lateral direction relative to the vehicle body (e.g. 0–5 mm). This is accomplished by the thick radial sections 74, 74' of the elastomeric necks 70, 70' each with their separate rate plate 72, 72' acting in compression and tension transverse to the rate plates at all vibratory amplitudes of the cradle at these mounting points in the lateral direction relative to the vehicle body.

The above arrangement of cradle mounts 44 and 45 with their soft linear rate in the fore and aft direction and in the vertical direction has been found to be very effective in isolating small-amplitude high-frequency vibrations of the front-suspension control arms (e.g. greater than 25 Hz) caused by front-drive wheel impacts with an irregular road surface while their stiff linear rate in the lateral direction has been found to be very effective in controlling and isolating lateral vibrations of the front-suspension control arms at all amplitudes and throughout the frequency range for good road handling. On the other hand, the non-linear rates of the cradle mounts in the fore and aft direction and vertical direction have been found to be very effective in controlling and isolating large-amplitude low-frequency vibration of the front-suspension control arms (e.g. less than 25 Hz) caused by severe front-drive wheel impacts with an irregular road surface and/or braking or acceleration loads. Moreover, this combination of linear and non-linear rates in the cradle mounting has been found to be very effective in helping to control and isolate vibrations of the powertrain when mounted on the cradle as will now be described.

Figure 3:
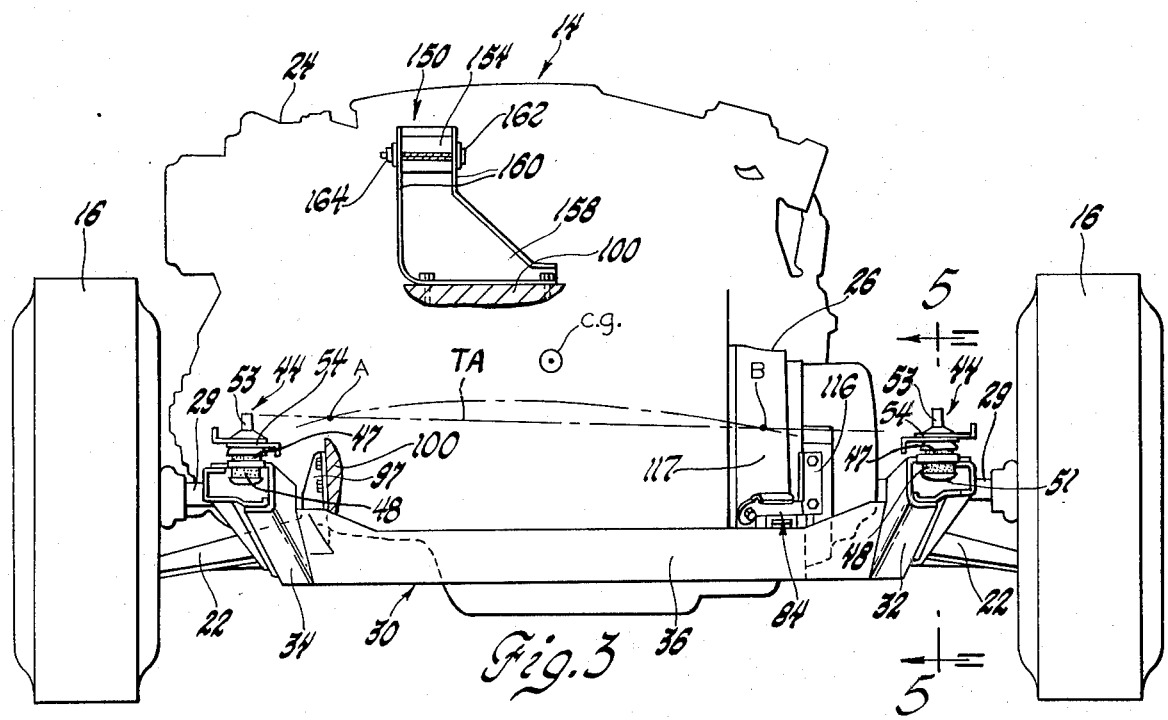
FIG. 3 is a front view taken along the line 3—3 in FIG. 2 with the powertrain shown in outline.

In the vibratory system of the powertrain 14 that is shown, there are two points A and B of minimum vibratory force, i.e. node points, in the first bending mode with the point A located on the transverse engine-transmission axis TA near the front end of the engine 24 and the other point located on this axis near the rear end of the transmission 26 as shown in FIGS. 3 and 16. The powertrain 14 is mounted so that all of its weight is directly supported by the cradle 30 adjacent these node points and this is accomplished with a three-point cushion mounting arrangement comprising a single engine mount 82 located adjacent and below the elevation of node point A and two transmission (transaxle) mounts 84 and 86 located on the respective front and rear side of the transmission 26 adjacent the opposite sides of and below the elevation of node point B. With such orientation of the transmission mount 84 and 86, they will be referred to as the front and rear transmission mount respectively.

As shown in FIGS. 1, 2, 3, 4 and 12–14, the engine mount 82 comprises an elastomeric block or cushion 88 which has an M-shape in side elevation (FIG. 12) and is bonded at its lower and upper side to a cradle mounting bracket 90 and a cushion mounting bracket 92 respectively. The cradle mounting bracket 90 is bolted to a bracket 95 which is welded to the inner side of the cradle side-rail 34 at the front end of the engine and the cushion mounting bracket 92 is bolted to an engine mounting bracket 97 which in turn is bolted directly to the front end of the engine block 100. In addition, a cross-pin 101 is fixed to opposite upstanding sides 102 integral with the cradle mounting bracket 90 and extends across and above a channel 104 formed in the cushion mounting bracket 92 to maintain connection between the two brackets 90 and 92 and thus between the engine and cradle should separation occur in the elastomeric block 88. As oriented, the elastomeric block 88 provides a low or soft substantially linear spring rate in the fore and aft, vertical and lateral directions as shown in FIG. 16 for cushioning all motions of the powertrain except large pitching motions thereof. For large pitching motions of the powertrain, the elastomeric block 88 is provided with a pair of voids 106 and 107 in the legs thereof which extend longitudinally of the engine and thus transversely of the vehicle body and are located adjacent upwardly and outwardly extending rate control arms 108 and 109, respectively, formed integral with the ends of the cushion mounting bracket 90 as shown in FIG. 12. As a result, when the powertrain attempts to pitch to a large degree (e.g. greater than 3°) in either the clockwise or counterclockwise direction as viewed in FIGS. 4 and 16 depending on whether the transmission is in forward or reverse drive respectively, the voids 106 and 107 will respectively close against the resistance of the respective rate control arms 108 and 109 and the elastomeric block 88 because of the resistance to further deformation thereof will then provide a non-linear pitch rate which increases with increasing large pitching amplitude to help control and isolate such large pitching powertrain motions.

The front transmission mount 84, as shown in FIGS. 1–4, 8, 9 and 14, comprises a solid elastomeric block or cushion 110 which is bonded at opposite sides to a cushion mounting plate 112 and a cradle mounting bracket 114, respectively. The cushion mounting plate 112 is bolted to a transmission mounting bracket 116 which in turn is bolted to the front side of the transmission (transaxle) case 117 adjacent and below the elevation of node point B while the cradle mounting bracket 114 is bolted to the front cradle cross-rail 36 near the cradle side-rail 32. In addition, the mounting plate 112 is provided with an integral hook 120 which is received through an opening 122 in the cradle mounting bracket 114 to maintain connection between the plate 112 and the bracket 114 and thus between the transmission and cradle should separation occur in the elastomeric block 110. The elastomeric block 110 is oriented at 45° looking in elevation longitudinally of the engine and transversely of the vehicle body as seen in FIG. 8 and provides a low or soft substantially linear spring rate in the fore and aft, vertical and lateral directions as shown in FIG. 16 for cushioning all motions of the powertrain except large pitching motions thereof. For large pitching motions of the powertrain, the bracket 114 is formed with an integral rate control arm 124 which is engaged by the elastomeric block 110 on pronounced pitching motion (e.g. greater than 3°) of the powertrain in a clockwise direction as viewed in FIGS. 4 and 16 when the transmission is in forward drive. On such contact with the rate control arm 124, further deformation of the elastomeric block 110 is then gradually resisted with further increasing large pitching amplitude resulting in a non-linear pitch rate which increases with pronounced and increasing pitch of the powertrain to help control and isolate such pitching motions.

The rear transmission mount 86, as shown in FIGS. 1, 2, 4, 10, 11 and 14, comprises a solid elastomeric block or cushion 130 which is bonded on opposite sides to a mounting plate 131 and a cradle mounting bracket 132. The mounting plate 131 is bolted to a transmission mounting bracket 135 which in turn is bolted to the rear side of the transmission case 117 adjacent and below the elevation of node point B. The cradle mounting bracket 132 is directly bolted to the rear cradle cross-rail 38. In addition, a hook 139 is integrally formed with the mounting plate 131 and is received in an opening 140 in the cradle mounting bracket 132 to maintain connection between the plate 131 and bracket 132 and thus between the transmission and cradle should separation occur in the elastomeric block 130. The elastomeric block 130 is oriented at 45° like the front transmission mount but in the opposite direction and provides a low or soft substantially linear spring rate in the fore and aft, vertical and lateral directions as shown in FIG. 16 for cushioning all motions of the powertrain except large pitching motions thereof. For large pitching motions of the powertrain, a rate conrol arm 142 is formed integral with the transmission mounting bracket 135 so as to be engaged by the elastomeric block 130 on pronounced pitching motions of the powertrain in the clockwise direction as viewed in FIGS. 4 and 16 when the transmission is in forward drive. With such resistance and deformation, the elastomeric block 130 then provides a non-linear pitch rate which increases with pronounced and increasing large pitching amplitudes of the powertrain to help control and isolate such large pitching motions.

Thus, the powertrain 14 has all its weight elastomerically supported at three points on the cradle 30 which in turn is elastomerically supported at four high impedance points on the vehicle body 10 as shown schematically in FIG. 16. With the powertrain mounts 82, 84 and 86 and the cradle mounts 44 and 45 in series, they thus provide an effective very low spring rate between the powertrain and the vehicle body which is lower or softer than their separate spring rates while the cradle mounts remain effective to control and isolate the vibrations of the front-suspension control arms 22. The very soft cushioning of the powertrain provided by the linear rates of both the cradle mounts 44 and 45 and the powertrain mounts 82, 84 and 86 has been found to provide very effective control and isolation of small-amplitude high-frequency vibrations in the fore and aft, vertical, lateral, roll and yaw directions as well as providing some control and isolation of the pitching motions of the powertrain at low torque. On the other hand, the non-linear rates of both the cradle mounts 44 and 45 and the powertrain mounts 82, 84 and 86 have been found to be very effective in controlling and isolating large-amplitude low-frequency powertrain vibrations as well as providing some control and isolation of the pitching motions of the powertrain at high torque.

To maintain the very effective vibration control and isolation provided by the cradle and powertrain mounts in all but the pitch direction as above described and to avail of the substantial powertrain pitch control and isolation that they do provide as also described above, there is additionally combined therewith a torque reaction strut assembly 150 which is cushion mounted with both linear and non-linear spring rates between the front side of the powertrain 14 and a rigid forward portion 152 of the vehicle body 10 which extends transversely thereof ahead of the powertrain. As shown in FIGS. 1-4, 14 and 15, the torque reaction strut assembly 150 comprises a rigid strut or link 154 which has an elastomeric bushing or cushion 155 press-fitted in a circular opening 156 in each end thereof with a sleeve 157 extending through the center of and bonded to each of the elastomeric bushings. The strut 154 extends longitudinally (fore and aft) and generally horizontally with respect to the vehicle body and is connected to the powertrain 14 at an elevation above and relative to the center of gravity (c.g.) thereof so as to directly resist the pitching forces. For such connection, there is provided an engine mounting bracket 158 which is bolted to the front side of the engine block 100 at this balance point and has parallel arms 160 between which one end of the strut 154 is received. A bolt 162 extends through one bracket arm and bushing sleeve at this end and then the other bracket arm and is secured in place with a nut 164. The ends of the bushing sleeve 157 are serrated so as to prevent relative turning of the sleeve on tightening of the nut. The other end of the strut 154 is connected to the transverse body frame member 152 by a bracket 166, bolt 168 and nut 169 in a similar manner. The axes of the strut bolts 160 and 168 are parallel and extend longitudinally of the engine and transmission so that with pitch of the powertrain, the strut is placed in tension when the transmission is in forward drive and is placed in compression when the transmission is in reverse drive.

Figure 15:
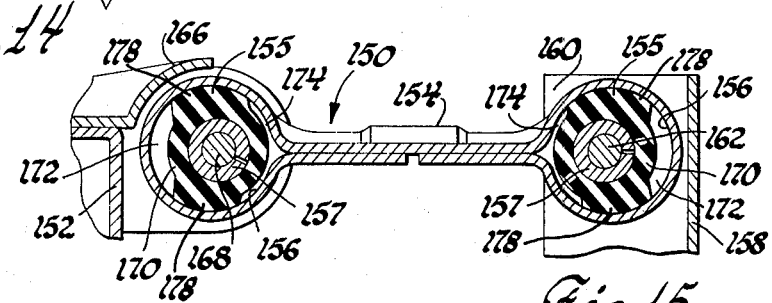
FIG. 15 is an enlarged view of the torque reaction strut assembly taken along the line 15—15 in FIG. 2.

The strut elastomeric bushings 155 have a low or soft substantially linear spring rate to cushion small-amplitude powertrain pitching motions occurring with low torque and have a non-linear spring rate to cushion large-amplitude pitching motions occuring with high torque. On the other hand, the strut 154 and bushings 155 have no substantial effect in controlling purely vertical and lateral vibrations of the powertrain which are instead controlled and isolated by the powertrain mounts and the cradle mounts as previously described. As shown in FIG. 15, the strut bushings 155 have a central annular body 170 which extends about their sleeve 157 and is spaced radially inward of the strut in the opening 156 in the fore and aft direction with predetermined large and small clearances 172 and 174, respectively. In addition, the strut bushings 155 are formed with integral and oppositely extending radial ribs 178 in the vertical direction which engage the strut at diametrically opposite areas. As a result, the strut bushings 155 cooperatively provide a low or soft substantially linear spring rate in shear across their ribs 178 in the fore and aft direction to cushion powertrain pitching motions at low amplitudes occurring with low torque (e.g. less than 3°) as allowed by the large clearances 172 when the transmission is in forward drive and at lower amplitudes (e.g. less than 1°) as allowed by the small clearances 174 when the transmission is in reverse drive. Then when the powertrain pitching amplitudes become large at high torque in forward and reverse drive (e.g. greater than 3° and 1° respectively), the large and small clearances 172 and 174 close respectively so that the body 170 of each of the bushings 155 then engages the strut and cooperatively provide an increasing spring rate in compression with increasing large pitching amplitudes to cushion the pitching motions at such high torque.

The torque reaction strut assembly 150 with its soft linear spring rate together with the soft linear pitch rates of the powertrain mounts 82, 84 and 86 and both the soft fore and aft rates and vertical rates of the cradle mounts 44 and 45 has been found to be very effective in controlling and isolating small-amplitude high-frequency pitching vibrations of the powertrain occurring at low torque. On the other hand, the torque reaction strut assembly 150 with its non-linear rate together with the non-linear rates of both the powertrain mounts 82, 84 and 86 and the cradle mounts 44 and 45 has been found to be very effective in controlling and isolating large-amplitude low-frequency pitching vibrations of the powertrain occurring at high torque.

For example, assuming torque reaction in the powertrain 14 in the clockwise direction as viewed in FIGS. 4 and 16 which occurs when the transmission is in forward drive, the torque reaction strut assembly 150 will be placed in tension to cushion such pitching motions with its soft linear rate at low torque and alternatively with its non-linear rate at high torque provided by the elastomeric bushings 155. At the same time, the powertrain mounts 82, 84 and 86 will cushion such pitching motions of the powertrain with their soft linear pitch rate at the low torque and alternatively with their non-linear pitch rate at the high torque. Meantime, the cradle will be caused to move both fore and aft and vertically with the pitching powertrain and thus the cradle mounts 44 and 45 by acting on the cradle will also cushion such pitching powertrain motions with their soft linear fore and aft rates and soft linear vertical rates at low torque and alternatively with their non-linear rates in these directions at high torque. On the other hand, when the pitching motion of the powertrain 14 is in the counterclockwise direction as viewed in FIGS. 4 and 16, which occurs when the transmission is in reverse drive and thus typically with less engine throttle opening and therefor at lower torque, the torque reaction strut assembly 150 is placed in compression to cushion such smaller pitching motions with both its linear and non-linear rates in cooperation with the linear pitch rate of the powertrain mounts 82, 84 and 86, the non-linear pitch rate of the engine mount 82 if need be, the linear fore and aft and vertical rates of the cradle mounts 44 and 45 and also the non-linear rates of the latter if need be.

In the front-drive vehicle shown, the powertrain 14 weighs approximately 500 pounds and the cradle 30 weights approximately 35 pounds and effective vibration control and isolation of the powertrain 14 and the suspension lower control arms 22 was obtained with cushion mount linear spring rates about as follows:

| Cushion Mount | Linear Spring Rate (N/mm) | | |
|---|---|---|---|
| | $K_f$ (fore and aft) | $K_l$ (lateral) | $K_v$ (vertical) |
| 44 | 360 | 1860 | 320 |
| 45 | 880 | 2750 | 860 |
| 82 | 250 | 70 | 360 |
| 84 | 180 | 50 | 1180 |
| 86 | 220 | 60 | 220 |
| 150 | 350 | | |

Furthermore, in the vehicle shown, the cradle 30 is also adapted to accommodate the powertrain when provided with an automatic transmission and in that case, the rate of the torque reaction strut assembly 150 and also the fore and aft rate of the engine mount 82 are reduced as compared with their respective rates for the manual transmission because of the reduced torque reaction. With an automatic transmission, effective vibration isolation was obtained with the torque reaction strut assembly having a linear rate of about 180 N/mm and with the engine mount 82 having a linear fore and aft rate of about the same value. Furthermore, it will be understood that the mounting arrangement is also adapted to accommodate an in-line four-cylinder engine in lieu of the V-6 engine shown without change in the cradle cushion mounts and without changing the powertrain mounting points. However, there will typically be some adjustment of their powertrain mounts rates but not necessarily that of the torque reaction strut assembly according to the particular vibration characteristics of the four-cylinder engine selected.

Thus, the above described preferred embodiment is intended to be illustrative of the invention which may be modified within the scope of the appended claims.

The embodiments of the invention in which an exclusive property or privilege is claimed are defined as follows:

1. In a front-wheel-drive vehicle having a cradle that is cushion mounted on the vehicle body and to which independent front-suspension control arms are mounted and further having a powertrain including an engine and transmission and differential that is cushion mounted on the cradle and wherein both the engine and transmission are positioned transversely in the vehicle body: the improvement comprising in combination, a plurality of cradle mounts supporting the cradle with all its weight at mounting points on the vehicle body, said cradle mounts including cushion and rate control means arranged so as to provide a soft substantially linear spring rate at small cradle vibration amplitudes and a non-linear spring rate at large cradle vibration amplitudes in both a fore and aft direction and a vertical direction relative to the vehicle body and a stiff substantially linear rate at all cradle vibration amplitudes in a lateral direction relative to the vehicle body, a plurality powertrain mounts supporting the powertrain with all its weight at mounting points on the cradle, said powertrain mounts including cushion and rate control means arranged so as to provide soft substantially linear spring rates at all powertrain vibration amplitudes in the fore and aft, vertical and lateral directions and at small powertrain vibration amplitudes in a pitching direction relative to the vehicle body and further provide a non-linear spring rate at large powertrain vibration amplitudes in the pitching direction, and powertrain torque reaction means connected between the powertrain and a mounting point on the vehicle body so as to be in either tension or compression on pitching of the powertrain depending on whether the transmission is in forward or reverse drive, said powertrain torque reaction means including cushion and rate control means arranged so as to provide a soft substantially linear spring rate at small powertrain vibration amplitudes in the pitching direction and a non-linear spring rate at large powertrain vibration amplitudes in the pitching direction.

2. In a front-wheel-drive vehicle having a cradle that is cushion mounted on the vehicle body and to which independent front-suspension control arms are mounted and further having a powertrain including an engine and transmission and differential that is cushion mounted on the cradle and wherein both the engine and transmission are positioned transversely in the vehicle body: the improvement comprising in combination, a plurality of cradle mounts supporting the cradle with all its weight at mounting points on the vehicle body, said cradle mounts including cushion and rate control means arranged so as to provide a soft substantially linear spring rate at small cradle vibration amplitudes and a non-linear spring rate at large cradle vibration amplitudes in both a fore and aft direction and a vertical direction relative to the vehicle body and a stiff substantially linear rate at all cradle vibration amplitudes in a lateral direction relative to the vehicle body, an engine mount and a pair of transmission mounts connected to the engine and transmission respectively and supporting the powertrain with all its weight at mounting points on the cradle, said engine and transmission mounts including cushion and rate control means arranged so as to provide soft substantially linear spring rates at all powertrain vibration amplitudes in the fore and aft, vertical and lateral directions and at small powertrain vibration amplitudes in a pitching direction relative to the vehicle body and a non-linear spring rate at large powertrain vibration amplitudes in the pitching direction, and powertrain torque reaction means connected between the powertrain and a mounting point on the vehicle body so as to be in either tension or compression on pitching of the powertrain depending on whether the transmission is in forward or reverse drive, said powertrain torque reaction means including cushion and rate control means arranged so as to provide a soft substantially linear spring rate at small powertrain vibration amplitudes in the pitching direction and a non-linear spring rate at large powertrain vibration amplitudes in the pitching direction.

3. In a front-wheel-drive vehicle having a cradle that is cushion mounted on the vehicle body and to which independent front-suspension control arms are mounted and further having a powertrain including an engine and transmission and differential that is cushion mounted on the cradle and wherein both the engine and transmission are positioned transversely in the vehicle body: the improvement comprising in combination, a plurality of cradle mounts supporting the cradle with all its weight at mounting points on the vehicle body, said cradle mounts including cushion and rate control means arranged so as to provide a soft substantially linear spring rate at small cradle vibration amplitudes and a non-linear spring rate at large cradle vibration amplitudes in both a fore and aft direction and a vertical direction relative to the vehicle body and a stiff substantially linear rate at all cradle vibration amplitudes in a lateral direction relative to the vehicle body, a plurality of powertrain mounts supporting the powertrain with all its weight at mounting points on the cradle, said powertrain mounts including cushion and rate control means arranged so as to provide soft substantially linear spring rates at all powertrain vibration amplitudes in the fore and aft, vertical and lateral directions and at small powertrain vibration amplitudes in a pitching direction relative to the vehicle body and further provide a non-linear spring rate at large powertrain vibration amplitudes in the pitching direction, and powertrain pitch reaction means connected between the powertrain and a mounting point on the vehicle body, said powertrain torque reaction means including a strut extending in the fore and aft direction so as to be in either tension or compression on pitching of the powertrain depending on whether the transmission is in forward or reverse drive, said powertrain torque reaction means further including cushion and rate control means at opposite ends of said strut arranged so as to provide a soft substantially linear spring rate at small powertrain vibration amplitudes in the pitching direction and a non-linear spring rate at large powertrain vibration amplitudes in the pitching direction.

* * * * *

UNITED STATES PATENT AND TRADEMARK OFFICE
CERTIFICATE OF CORRECTION

PATENT NO. : 4,240,517                                    Page 1 of 3

DATED : December 23, 1980

INVENTOR(S) : John H. Harlow, Jr., et al.

It is certified that error appears in the above—identified patent and that said Letters Patent is hereby corrected as shown below:

Columns 5-8 as shown on the attached sheets should be added.

Signed and Sealed this

*Fifth* Day of *January 1982*

[SEAL]

*Attest:*

*Attesting Officer*

GERALD J. MOSSINGHOFF

*Commissioner of Patents and Trademarks* bracket 39 and the associated bushing sleeve 41 and is secured with a nut 43. All the above front-suspension control arm mounting structure is shown for the left control arm and it will be understood that the right control arm is similarly mounted.

The cradle 30 is mounted at four high impedance points on the vehicle body 10 on opposite sides of the front wheel wells and remote from the powertrain 14. The cradle cushion mounting arrangement comprises two front cushion mounts 44 and two rear cushion mounts 45. Each of the front cradle cushion mounts 44 is located adjacent the front end of one of the cradle side-rails 32 and 34 ahead of the transversely positioned engine 24 and transmission 26. Each of the rear cushion mounts 45 is located adjacent the rear end of one of the cradle side-rails 32 and 34 rearward of the differential 28. With the relative arrangement of the powertrain 14 and the cradle 30 shown, a greater portion of the weight of the powertrain is supported by the two rear cradle mounts 45 as well as the roll stabilizer bar loads. In the cradle cushion mounting arrangement shown, the two front mounts 44 are identical to each other and the rear cradle mounts 45 are also identical to each other and similar in construction and assembly to the front cradle mounts 44. In the description of the left front cradle mount 44 that follows, it will thus be understood that such description applies to the right front mount and that the corresponding parts of the rear cradle mounts 45, as shown in FIG. 7, will be identified by the same numerals but primed. Furthermore, it will be understood that the appropriate parts of the rear cradle mounts are made proportionately larger in load bearing capacity is than the front cradle mounts to handle the higher loading thereon as will be seen by the higher spring rates they are provided with as described later.

Describing now the left front cradle mount 44 which is best seen in FIGS. 5, 6 and 7, there is provided a pair of ring-shaped elastomeric cushions 47 and 48, a spacer 50, a retainer 51, a bolt 52 and a cage nut 53. The spacer 50 engages at its upper end with the lower side of a rigid front underbody portion 54 of the vehicle body 10 about a cradle mounting bolt hole 55 therethrough over which the cage nut 53 is located. The spacer 50 has an annular downwardly extending and radially outwardly flared rate control collar 56 formed integral therewith and the upper cushion 47 engages at its upper end with the lower side of the spacer 50 inward of its rate control collar. The rate control collar 56 provides for non-linear rate control in the cradle mount in the vertical direction as will be described in detail later. The upper cushion 47 has a washer 57 bonded to its lower end which engages the upper side of the cradle side-rail 32 about a mounting hole 58 therethrough which aligns with the overhead bolt hole 55 in the rigid underbody portion 54. A sleeve 60 having a radially outwardly extending shoulder 62 at its lower end is bonded to the lower cushion 48. The sleeve 60 extends vertically upward through the mounting hole 58 in the cradle side-rail while the shoulder 62 on the sleeve engages the lower side of the cradle side-rail about the hole. The spacer 50 also has a centrally located elongated hollow neck 64 of generally rectangular cross-section which extends vertically downward through a correspondingly-shaped central opening 66 in the lower cushion 48 and engages at its lower end with the upper side of the retainer 51 about a central bolt hole 68 therethrough.

The retainer 51 engages the lower end of the lower cushion 48 and the spacer 50 and retainer 51 are clamped together through the spacer neck 64 and against the lower side of the rigid underbody portion 54 by the bolt 52 which extends vertically upward through the retainer bolt hole 68, spacer neck 64 and underbody portion bolt hole 55 and is threaded to the cage nut 53. The lower cushion 48 has an integral upwardly extending annular neck 70 which is bonded at its periphery to the interior of sleeve 60 along its length except as described later and has a central opening therethrough co-extensive with cushion opening 66 through which the spacer neck 64 extends with an interference fit. Thus, the elastomeric annular neck 70 is tightly captured between sleeve 60 and spacer neck 64. In addition, a pair of perforated rate plates 72 are molded in place in the elastomeric neck 70 of the lower cushion 48 on opposite sides thereof with these plates extending longitudinally or fore and aft of the cradle side-rail and thus the vehicle body. Furthermore, a pair of voids 73 are formed at diametrically opposite locations between the interior of the sleeve 60 and the periphery of the elastomeric neck 62 in the two areas intermediate the rate plates 72. The voids 73 extend vertically the length of the sleeve 60 and are bisected by a plane extending longitudinally or fore and aft of the cradle side-rail and thus the vehicle body. The voids 73 leave the elastomeric neck 70 with diametrically opposite relatively thick radial sections 74 each containing one of the rate plates 72 and joining the spacer neck 64 and the sleeve 60 at opposite sides thereof in the lateral direction relative to the cradle side-rail as seen in FIG. 6. In addition, the voids 73 leave the elastomeric neck 70 with diametrically opposite thin radial sections 75 trapped between the spacer neck 64 and the sleeve 60 in the fore and aft direction relative to the cradle side-rail as seen in FIG. 5. The thin radial sections 75 of the elastomeric neck 70 are spaced radially inward of the interior of the sleeve 60 and provide non-linear rate control in the cradle mount in the fore and aft direction as described in more detail later. To fix the above described orientation of the cradle mount assembly relative to the cradle and thus also to the powertrain mounted thereon, the mounting hole 58 in the cradle side-rail is provided with parallel flats 76 which extend longitudinally or fore and aft of the cradle side-rail and engage corresponding parallel flats 78 formed on the periphery of the sleeve 60 which is bonded to the lower cushion 48.

With the cradle mounting arrangement thus provided and as shown schematically in FIG. 16, the cradle mounts 44 and 45 operate to provide a low or soft substantially linear spring rate cushioning cradle motion at small vibratory amplitudes in the vertical direction (shake) relative to the vehicle body (e.g. less than 5 mm). This is accomplished by their upper cushions 47, 47' providing through their height soft linear spring rates in compression at relatively low and high values to resist upward vertical movement of the cradle 30 relative to the vehicle body at these mounting points until further compression thereof is resisted by the rate control collars 56, 56' while the lower cushions 48, 48' through their height provide correspondingly soft substantially linear spring rates in compression at relatively low and high values but to resist relative downward movement of the cradle. At large vibratory amplitudes in the vertical direction (e.g. greater than 5 mm), the deformation of the upper cushions 47, 47' is then resisted by gradual engagement with the rate control collar 56, 56' resulting in these cushions then providing non-linear rates in the vertical direction which then increase with increasing large vibratory amplitude of the cradle in this direction at these mounting points to thereby provide increasing stiffness to control and isolate such vibrations.

The cradle mounts 44 and 45 also operate to provide a low or soft substantially linear spring rate cushioning cradle motion at small vibratory amplitudes in the fore and aft direction (e.g. less than 5 mm). This is accomplished by the transverse shear resistance along the thick radial sections 74, 74' of the elastomeric necks 70, 70' parallel to the rate plates 72, 72' which effectively provides soft substantially linear spring rates at relatively low and high values resisting such motion at small vibratory amplitudes at these mounting points until the thin radial sections 75, 75' of the elastomeric necks bottom out in the voids 73, 73' at large vibratory amplitudes in the fore and aft direction (e.g. greater than 5 mm). With such bottoming out, there is resultantly provided non-linear spring rates in the fore and aft direction in the front and rear cradle mounts of relatively low and high value which increase with increasing large vibratory amplitude of the cradle in the fore and aft direction at these mounting points to control and isolate such vibrations.

On the other hand, the cradle mounts 44 and 45 operate to provide a high or stiff substantially linear spring rate cushioning cradle motion at all vibratory amplitudes in the lateral direction relative to the vehicle body (e.g. 0-5 mm). This is accomplished by the thick radial sections 74, 74' of the elastomeric necks 70, 70' each with their separate rate plate 72, 72' acting in compression and tension transverse to the rate plates at all vibratory amplitudes of the cradle at these mounting points in the lateral direction relative to the vehicle body.

The above arrangement of cradle mounts 44 and 45 with their soft linear rate in the fore and aft direction and in the vertical direction has been found to be very effective in isolating small-amplitude high-frequency vibrations of the front-suspension control arms (e.g. greater than 25 Hz) caused by front-drive wheel impacts with an irregular road surface while their stiff linear rate in the lateral direction has been found to be very effective in controlling and isolating lateral vibrations of the front-suspension control arms at all amplitudes and throughout the frequency range for good road handling. On the other hand, the non-linear rates of the cradle mounts in the fore and aft direction and vertical direction have been found to be very effective in controlling and isolating large-amplitude low-frequency vibration of the front-suspension control arms (e.g. less than 25 Hz) caused by severe front-drive wheel impacts with an irregular road surface and/or braking or acceleration loads. Moreover, this combination of linear and non-linear rates in the cradle mounting has been found to be very effective in helping to control and isolate vibrations of the powertrain when mounted on the cradle as will now be described.

In the vibratory system of the powertrain 14 that is shown, there are two points A and B of minimum vibratory force, i.e. node points, in the first bending mode with the point A located on the transverse engine-transmission axis TA near the front end of the engine 24 and the other point located on this axis near the rear end of the transmission 26 as shown in FIGS. 3 and 16. The powertrain 14 is mounted so that all of its weight is directly supported by the cradle 30 adjacent these node points and this is accomplished with a three-point cushion mounting arrangement comprising a single engine mount 82 located adjacent and below the elevation of node point A and two transmission (transaxle) mounts 84 and 86 located on the respective front and rear side of the transmission 26 adjacent the opposite sides of and below the elevation of node point B. With such orientation of the transmission mount 84 and 86, they will be referred to as the front and rear transmission mount respectively.

As shown in FIGS. 1, 2, 3, 4 and 12-14, the engine mount 82 comprises an elastomeric block or cushion 88 which has an M-shape in side elevation (FIG. 12) and is bonded at its lower and upper side to a cradle mounting bracket 90 and a cushion mounting bracket 92 respectively. The cradle mounting bracket 90 is bolted to a bracket 95 which is welded to the inner side of the cradle side-rail 34 at the front end of the engine and the cushion mounting bracket 92 is bolted to an engine mounting bracket 97 which in turn is bolted directly to the front end of the engine block 100. In addition, a cross-pin 101 is fixed to opposite upstanding sides 102 integral with the cradle mounting bracket 90 and extends across and above a channel 104 formed in the cushion mounting bracket 92 to maintain connection between the two brackets 90 and 92 and thus between the engine and cradle should separation occur in the elastomeric block 88. As oriented, the elastomeric block 88 provides a low or soft substantially linear spring rate in the fore and aft, vertical and lateral directions as shown in FIG. 16 for cushioning all motions of the powertrain except large pitching motions thereof. For large pitching motions of the powertrain, the elastomeric block 88 is provided with a pair of voids 106 and 107 in the legs thereof which extend longitudinally of the engine and thus transversely of the vehicle body and are located adjacent upwardly and outwardly extending rate control arms 108 and 109, respectively, formed integral with the ends of the cushion mounting bracket 90 as shown in FIG. 12. As a result, when the powertrain attempts to pitch to a large degree (e.g. greater than 3°) in either the clockwise or counterclockwise direction as viewed in FIGS. 4 and 16 depending on whether the transmission is in forward or reverse drive respectively, the voids 106 and 107 will respectively close against the resistance of the respective rate control arms 108 and 109 and the elastomeric block 88 because of the resistance to further deformation thereof will then provide a non-linear pitch rate which increases with increasing large pitching amplitude to help control and isolate such large pitching powertrain motions.

The front transmission mount 84, as shown in FIGS. 1-4, 8, 9 and 14, comprises a solid elastomeric block or cushion 110 which is bonded at opposite sides to a cushion mounting plate 112 and a cradle mounting bracket 114, respectively. The cushion mounting plate 112 is bolted to a transmission mounting bracket 116 which in turn is bolted to the front side of the transmission (transaxle) case 117 adjacent and below the elevation of node point B while the cradle mounting bracket 114 is bolted to the front cradle cross-rail 36 near the cradle side-rail 32. In addition, the mounting plate 112 is provided with an integral hook 120 which is received through an opening 122 in the cradle mounting bracket 114 to maintain connection between the plate 112 and the bracket 114 and thus between the transmission and cradle should separation occur in the elastomeric block 110. The elastomeric block 110 is oriented at 45° looking in elevation longitudinally of the engine and transversely of the

UNITED STATES PATENT AND TRADEMARK OFFICE
CERTIFICATE OF CORRECTION

PATENT NO. : 4,240,517

DATED : December 23, 1980

INVENTOR(S) : John H. Harlow, Jr. et al

It is certified that error appears in the above—identified patent and that said Letters Patent is hereby corrected as shown below:

Column 12, line 56, claim 1, after "plurality", insert -- of --.

Signed and Sealed this

Sixteenth Day of March 1982

[SEAL]

Attest:

Attesting Officer

GERALD J. MOSSINGHOFF

Commissioner of Patents and Trademarks